July 31, 1962   R. E. CHABOT, JR   3,046,662
INTERPOLOMETER

Filed July 15, 1958   2 Sheets-Sheet 1

INVENTOR.
ROBERT E. CHABOT
BY
ATTORNEYS

July 31, 1962 R. E. CHABOT, JR 3,046,662
INTERPOLOMETER
Filed July 15, 1958 2 Sheets-Sheet 2

INVENTOR.
ROBERT E. CHABOT
BY
ATTORNEYS

3,046,662
INTERPOLOMETER
Robert E. Chabot, Jr., Georgetown, Mass., assignor to the United States of America as represented by the Secretary of the Air Force
Filed July 15, 1958, Ser. No. 748,776
3 Claims. (Cl. 33—76)
(Granted under Title 35, U.S. Code (1952), sec. 266)

The invention described herein may be manufactured and used by or for the United States Government for governmental purposes without payment to me of any royalty thereon.

This invention relates to an instrument for graphically performing certain mathematical computations and more particularly relates to an instrument which is useful to mechanically calculate intermediate values of a function according to some assumed law of change of value.

The solution of many problems in the engineering as well as scientific fields requires that various mathematical calculations be made. One of the more common types of computations required in these problems is that of linear interpolation. That is, in the Cartesian coordinate system, a series of points may be given in terms of X and Y coordinates, the problem being to find other points on the line which satisfy the function. Thus, the general problem of linear interpolation may be said to involve the solution of the equation:

$$Y = Y_0 + \frac{Y_1 - Y_0}{X_1 - X_0}(X - X_0)$$

where $X_0$, $Y_0$ and $X_1$, $Y_1$, are coordinates of two known points on the line.

This equation can be solved in a number of ways, most common among these being by ordinary computation and by the use of special tables prepared for the purpose. So, in order to solve the general equation of linear interpolation, as shown above, by ordinary computation methods six separate and distinct steps are required. Three of these steps are necessary to find the slope of the line. The fourth step is the subtraction of $X_0$ from X and the fifth step is to multiply this figure by the slope. The sixth and final step is to add this figure to $Y_0$ giving the value of Y and the answer to the problem.

The solution by use of tables such as the Rechentafeln tables by A. L. Crelle, also requires six separate steps. As in the computation method, three steps are required to find the slope. The fourth step is the subtraction of the initial value from the known value of the known ordinate. The fifth step is the reading of a value from the table and the sixth step is the addition of the terms of the equation.

It can be seen that the described processes are tedious, especially when a large number of computations are required. Also, the chance of error in this type of computation is very great because of the number of steps required and the transferring of values from computing machines or tables to data sheets for each of the required steps.

In my invention the general equation is solved by mechanically matching the X-scale with the Y-scale by certain adjustments involving the two known points. Once the adjustments have been made values of "Y" may be read off corresponding to any desired values of "X." Only four steps are required to be performed in order to solve the equation using the interpolometer described herein. In these four steps no mathematical computations are necessary, instead only simple settings on a graph or scale with little or no chance for error are required.

All three methods of interpolation are simplified if the same equation is used for several computations. In each of the three methods the complete sequence of steps is followed for the first interpolation only. Thereafter, in the computer and table methods three additional steps must be executed for each desired value whereas by employing the interpolometer only the single simple step of reading the corresponding X and Y values is necessary.

Thus, it can be seen that the interpolometer performs interpolation in the general case with fewer steps and greater simplicity than are required when tables or a computer are used. In a common special case where several interpolations are performed from one equation, the interpolometer does the job in one step.

Accordingly, an object of the present invention is to provide an instrument for graphically solving problems of linear interpolation.

Another object of the invention is to provide a means for determining the intermediate values of a known function by using fewer steps for finding the unknown values.

Still another object of the invention is to provide a means for interpolation wherein the chance of error is practically eliminated. This is accomplished by making unnecessary the copying and transferring of many figures with the consequent chance of error.

A still further object of the invention is to provide a device which is capable of accurately performing linear interpolation and is operable by a person having little or no knowledge of mathematics.

The results obtained by the interpolometer are much more dependable because of the minimum chance of error and since the results are easier and faster to obtain, the process is very much less tiring for the operator during the determination of a comparable number of interpolations.

These and many other objects, features, and advantages will become more apparent when considering the following description taken in connection with the accompanying drawings wherein.

Figure 1:
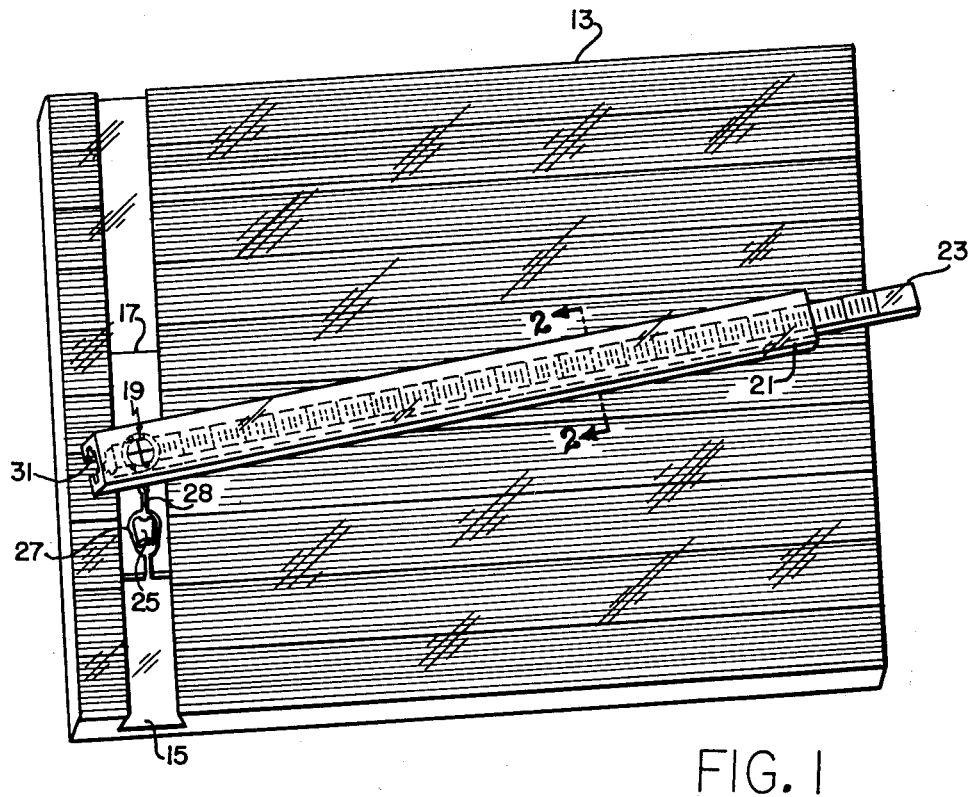
FIG. 1 is a general view of the assembled interpolometer.

Referring to FIG. 1, there is shown a general overall view of the interpolometer. The base portion 13 is engraved with ten equal major divisions along its vertical dimension. Each of these ten major divisions is in turn subdivided into ten parts making a total of one hundred equally spaced horizontal lines engraved on the surface of the base portion 13. A bevelled slot 15 is formed near the left-hand edge of the base portion 13. This slot 15 is adapted to guide a vertical slide member 17 along its length. Attached to the vertical slide 17 is a pivot assembly 19 which allows rotational movement of a transparent arm 21 containing the transparent X-scale 23. Also included in the vertical slide member 17 is a locking means having a sliding key 25 which is dimensioned to engage with the tapered edge 27 of the machined opening 29.

Figure 2:
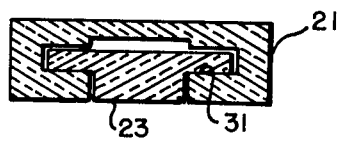
FIG. 2 is a sectional view of the X-scale arm across the line 2—2 of FIG. 1.
Figure 3:
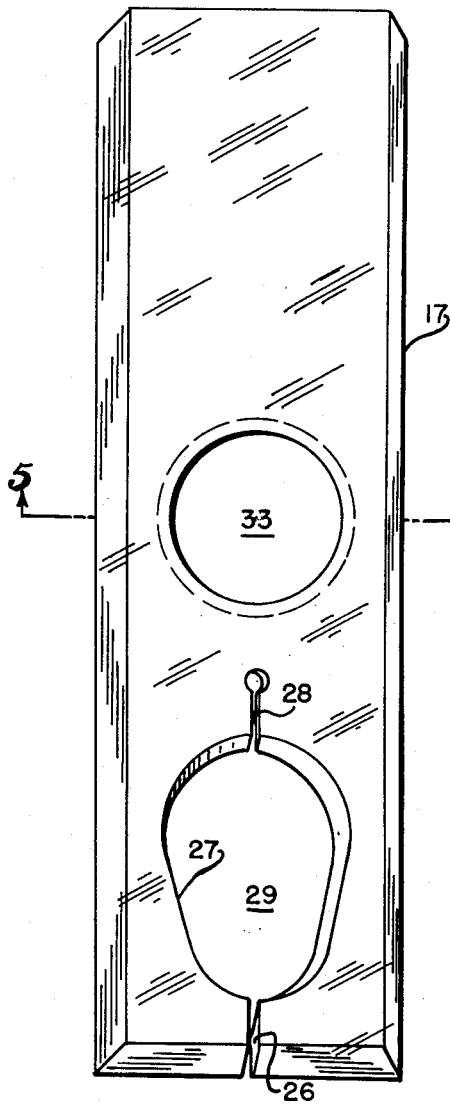
FIG. 3 is a view of the vertical slide showing the locking system and opening for receiving the pivot assembly.

The X-scale 23 slides in a slot 31 machined in the arm 21. In FIG. 2 there is shown a cross-sectional view of the X-scale 23 and the arm 21. The X-scale is dimensioned to slide freely through the slot 31 and has etched on its lower surface a series of scale markings from which readings may be taken. This marked lower surface of the X-scale 23 is in contact with the surface of the base portion 13 of interpolometer during operation of the device.

Figure 4:
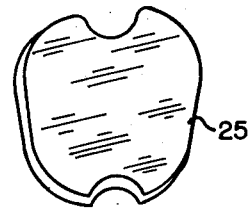
FIG. 4 shows the insert portion of the lock system.

Enlarged detailed views of the vertical slide 17 and its associated parts are shown in FIGS. 3, 4, 5 and 6. The slide 17 itself is dimensioned to fit the bevelled slot 15 in the base portion 13 so as to slide up and down freely in the slot. Included in the vertical slide 17 is an irregularly shaped opening 29 having flat tapered sides 27. A narrow keyhole slot 28 and a separation slot 26 are machined in the vertical slide as part of a locking system for keeping the slide in position after it has been properly set. In FIG. 4 there is shown the insert key 25 which fits into the opening 29 and when the key is forced downward toward the narrow part of the taper, the lower portion of the slide 17 is forced outward against the bevelled sides of the slot 15, thereby locking the slide 17 from further vertical movement.

Figure 5:
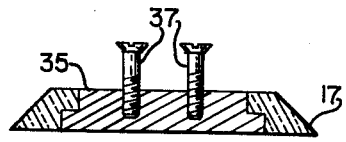
FIG. 5 is a cross-sectional view across the line 5—5 of FIG. 3 with the aluminum insert in position.
Figure 6:
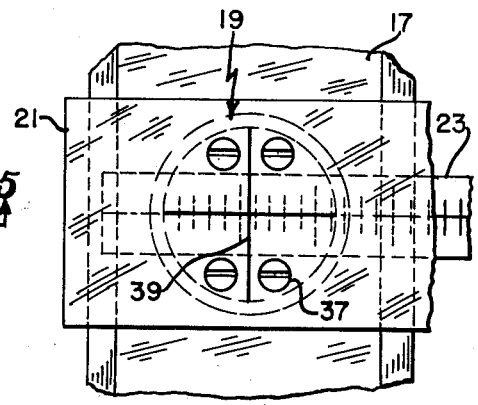
FIG. 6 shows a top view of the pivot assembly.

Also included in the vertical slide 17 is a circular opening 33 adapted to receive the pivot disc 35, shown in cross section in FIG. 5. The pivot disc 35 is preferably made of metal such as aluminum and serves to provide a means for securing the arm 21 to the vertical slide 17 as well as the turning center for the arm. A plurality of small screws 37 are used to fasten the arm to the pivot disc, the screws passing through the arm into tapped holes in the disc. Details of this assembly are shown in FIG. 6. Cross-hairs 39 are included on the aluminum pivot disc 35 to facilitate the determination of the settings of the device necessary for the solution of a particular problem.

The actual operation of the interpolometer is relatively simple and extremely fast and accurate. The following example of the solution of a problem in linear interpolation will show this clearly.

To solve the general problem of linear interpolation, which is $$Y_a = Y_0 + \frac{Y_1 - Y_0}{X_1 - X_0}(X_a - X_0)$$

where there is given $X_0 Y_0$; $X_1 Y_1$; and the problem is to find $Y_a$ which corresponds to any particular $X_a$. To make the explanation of operation of the interpolometer more easily understood, let us assign arbitrary values to the coordinates of the points on the line. Let us make $X_0$ and $X_1$ equal to 10 and 60 respectively and $Y_0$ and $Y_1$ equal to 20 and 45 respectively. The problem is to find $Y_a$ when $X_a = 22$.

To solve this problem using the interpolometer, the vertical slide member 17, which corresponds to the Y axis, is set so that the intersection of the cross-hairs 39 is aligned with the $Y_0$ value which is 20. The lock key 25 is then forced downward to lock the slide in position. The X-scale 23 is moved through the arm 21 unitl the $X_0$ value of 10 is aligned with the cross-hairs 39 on the pivot disc 35.

Now, the arm 21, including the X-scale 23, is rotated upward about the pivot until the $X_1$ value of 60 on the X-scale is directly over the $Y_1$ value of 45 on the base portion. The deviation from the horizontal of the arm 21 corresponds to the slope of a line which represents the original function and any corresponding set of values for X and Y can be read directly from the instrument. In the example given, to find $Y_a$ when $X_a = 22$, we look at the 22 mark on the X-scale and find that the corresponding $Y_a$ is equal to 26.

Thus, the speed and versatility of the instrument far surpasses any presently known method of linear interpolation. It should be noted that when using my invention, it is not necessary that either $X_0$ or $Y_0$ be set at zero value, that is, any initial value of either the X or Y coordinate may be used.

While only a single embodiment of the invention has been included in the description and the drawings, it should be understood that various changes and modifications are possible in the construction, proportion, and arrangement of the scales and portions of the instrument without departing from the true spirit and scope of the invention.

Having thus described my invention, what I claim as new and desire to secure by Letters Patent of the United States is:

1. In a device of the character described, a base portion having a series of equally spaced horizontal lines ruled thereon, said base portion having a slot extending vertically along one side of the face thereof, a guided element slidably mounted in said slot, a transparent arm pivotally mounted on said guided element, and a transparent linear scale slidably mounted within said arm for determining intermediate values of a known mathematical function by setting the arm carrying said scale at the angle forming the proper slope relative to the horizontal lines ruled on said base portion and reading corresponding intermediate coordinate values.

2. In a device of the character described, a base portion having a series of equally spaced horizontal lines ruled thereon, said base portion having a slot extending across the face thereof, a guided element slidably mounted in said slot, said guided element having a tapered opening therein, an arm pivotally mounted on said guided element, and a linear scale slidably mounted on said arm, and means for expanding said guided element to locking position including a tapered key member adapted to engage the taper of said opening in said guided element, said key being laterally slidable in said opening in the direction of said slot to cause part of said guided element to spread and grip the sides of said slot when said key exerts a force against the sides of said tapered opening, thereby preventing relative movement between said guided element and said base portion.

3. A device for performing linear interpolation comprising a rectangular base portion having a slot extending along one side thereof, said base portion having a series of horizontal lines ruled thereon to represent Y-axis values, a guided element slidably mounted in said slot, an arm pivotally mounted on said guided element for rotation about a point located on the longitudinal axis of said slot, a scale marked to represent X-axis values and adapted to slide along said arm, said scale having a centerline passing through the pivot point of said arm, thereby enabling determination of intermediate values of X and Y by adjusting said guided element to the known initial Y value and setting the known initial X value at the pivot point, rotating the X-scale until another known X value rests upon a corresponding known Y value on the base portion, any other X and Y value being found by reading corresponding values from the X-scale and the horizontal lines on the base portion.

References Cited in the file of this patent

UNITED STATES PATENTS

| 1,290,343 | Posner | Jan. 7, 1919 |
| 1,422,641 | Walters | July 11, 1922 |
| 1,667,812 | Miller | May 1, 1928 |
| 2,465,481 | Reiche | Mar. 29, 1949 |
| 2,471,450 | Reza | May 31, 1949 |

FOREIGN PATENTS

| 17,309 | Great Britain | 1915 |
| 320,190 | Germany | Apr. 12, 1920 |
| 541,411 | France | May 2, 1922 |
| 761,214 | France | Jan. 3, 1934 |
| 105,711 | Sweden | Oct. 13, 1942 |
| 269,218 | Switzerland | Feb. 16, 1951 |
| 81,613 | Norway | Apr. 13, 1953 |